Jan. 7, 1969  J. W. GOWAN  3,420,979

SUBMERGED ARC WELDING APPARATUS

Filed June 7, 1965  Sheet 1 of 2

INVENTOR:
JOHN W. GOWAN

BY Gravely Lieder & Woodruff
ATTORNEYS

INVENTOR:
JOHN W. GOWAN

BY
ATTORNEYS.

United States Patent Office 3,420,979
Patented Jan. 7, 1969

3,420,979
SUBMERGED ARC WELDING APPARATUS
John W. Gowan, Arnold, Mo., assignor to St. Louis Shipbuilding-Federal Barge, Inc., St. Louis, Mo., a corporation of Missouri
Filed June 7, 1965, Ser. No. 461,892
U.S. Cl. 219—125                                    8 Claims
Int. Cl. B23k 9/12; B23k 9/18; H05b 1/00

ABSTRACT OF THE DISCLOSURE

Automatic welding apparatus for submerged arc welding work along a seam comprising a backing trough having resiliently supported side walls forming a channel along one side of the weld seam and having backing media therein, means to support the work with the seam over said backing trough, welding means for welding along the seam, and means coacting with said welding means to provide localized pressure against said work in the area of the seam by compressing said backing trough to force the backing media against the underside of said seam beneath the welding means.

---

This invention relates to automatic welding, and more particularly relates to automatic welding techniques and apparatus utilizing a backing media confined within a resilient backing trough. More specifically the invention relates to automatic tandem or AC-DC submerged arc welding for achieving uniform, full penetration welding of material from one side by utilizing suitable backing media confined in a resilient backing trough.

Heretofore submerged arc welding, particulary in butt welding, has been accomplished by welding the workpieces from both sides which requires the material to be turned over and repositioned on the welding platens. It is apparent that care must be taken during welding of the second side to insure full penetration and to prevent entrapment of flux and other contaminants at the juncture of the opposing weld beads. Preferably, full penetration welding should be accomplished from one side, because it is more economical and also superior in consistent quality of welds.

Much difficulty has accompanied previous submerged arc welding techniques, because of the backing troughs heretofore employed. Generally, such troughs consist of a channel shape member with an elongated diaphragm (similar to a fire hose) extending therealong. The channel member is filled with a backing media that embeds the diaphragm. Workpieces for welding are held in place over the open top of the backing trough by clamps, jigs or any suitable means. Next, the diaphragm is inflated to force the backing media or flux under pressure against the underside of the material to be welded.

The backing flux is an important factor in submerged arc welding, and serves as cleaning agent, protective shield and a mold for the weld on the underside. While welding progresses, the point of fusion is hot enough to melt a portion of the flux which on cooling remains on the weld. Further, if the pressure applied to the underside of the material being welded is low, the weld bead on the underside will be large; and conversely, if the pressure is high, the weld bead will be small. Also, if the pressure is too high, full penetration welding cannot be achieved. A major difficulty accompanying submerged arc welding is that heat generated from welding causes expansion and distortion of the workpieces, particularly near the point of fusion, which dissipates as the workpieces cool. This distortion will cause the workpieces to form a series of concave and convex areas which forces the workpieces to lift from the trough if not securely held. Hence, it is apparent that the backing pressure will be erratic under the area being welded resulting in poor quality welds.

The present invention overcomes the problems attendant with distortion of the material during submerged arc welding by utilizing a resiliently cushioned backing trough and holding the workpieces down against such trough only in a small area surrounding the point of fusion. Briefly, the apparatus appertaining to the invention includes a welding head supported from a carriage that is suspended from a gantry beam and that is pnuematically powered transversely across the gantry beam. The welding head has four hold down wheels or rollers for applying holding pressure and to maintain the welding head elevation above the workpieces. The resilient backing trough which supports the workpieces during welding has a pair of spaced side rails supported from a steel base plate by resilient side walls. The trough is filled with flux or backing media. The lateral spacing between the steel rails and between the hold down rollers is equal so that the roller pressure against the workpieces is directly over the side rails.

During arc welding employing the invention, the gantry moves along the direction of a seam of the work carrying the welding head carriage. The hold down rollers are pressured against the work holding the work against the trough only in the area surrounding the point of fusion of the seam. The force exerted on the trough compresses the resilient side walls reducing the area allotted for flux or backing media. The reduction of area forces the flux tightly against the underside of the weld. A constant pressure under the weld is maintained by this technique because the condition is always uniform as the weld progresses. Any distortion that does occur does not affect the welding condition at the point of fusion. Thus, distortions occur and dissipate without affecting the quality of the weld.

It is therefore an important object of the invention to provide a method of submerged arc welding whereby uniform, high quality, full penetration welds may be made readily and inexpensively.

It is another object of the invention to provide a resilient backing trough for submerged arc welding.

It is another object of the invention to provide suitable apparatus for high quality, low cost submerged arc welding.

It is another object of the invention to provide a submerged arc welding system wherein a welding head is pressured against work supported on a resilient backing trough forcing flux within the trough to exert uniform pressure against the underside of the work.

It is still another object of the invention to provide a backing trough for submerged arc welding having resilient side walls which yield under pressure applied to work to maintain constant backing media pressure against the underside of the work.

It is still another object of the invention to provide gantry supported welding apparatus, and a resilient backing trough in a system for submerged arc welding wherein a constant backing pressure is exerted against work in the area undergoing welding.

It is still another object of the invention to provide a method of submerged arc welding wherein backing media pressure is applied during welding on the underside of work only in an area under the welding head.

These and other objects and advantages will become readily apparent from the ensuing description and appended claims taken in conjunction with the drawings wherein:

3

Figure 2:
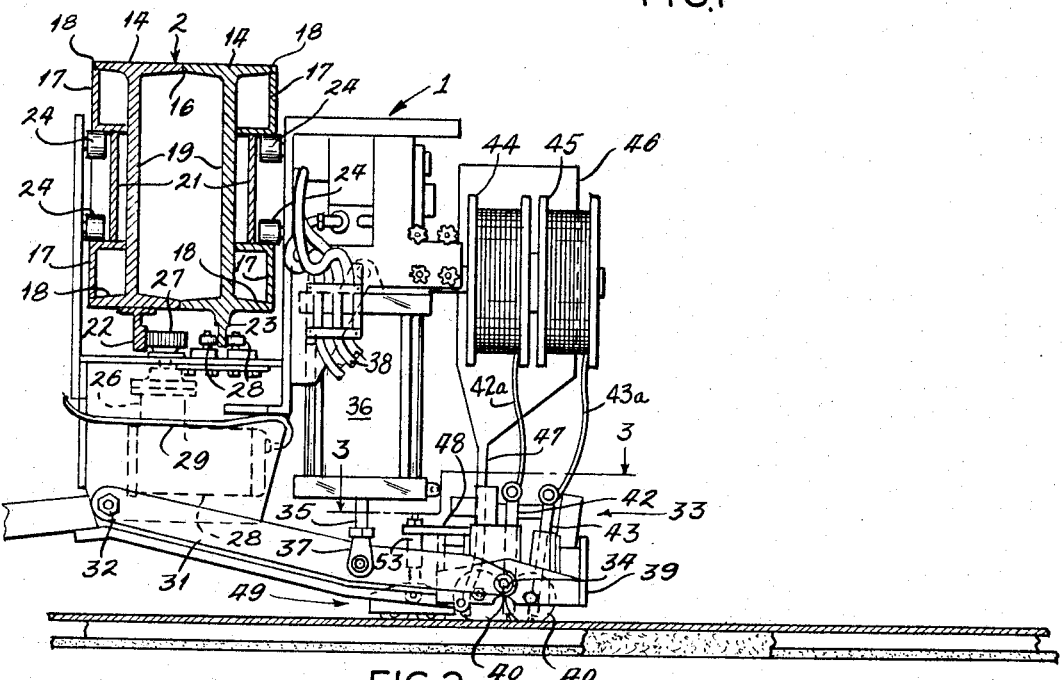
FIG. 2 is a side elevation taken along the line 2—2 in FIG. 1.
Figure 3:
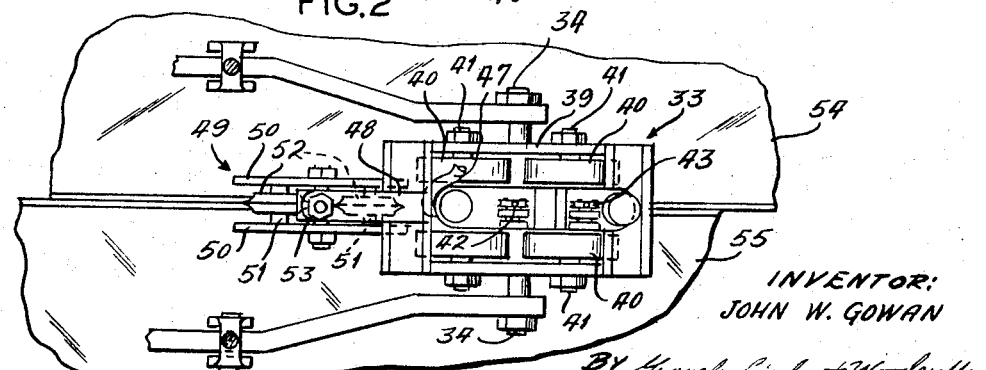
Figure 4:
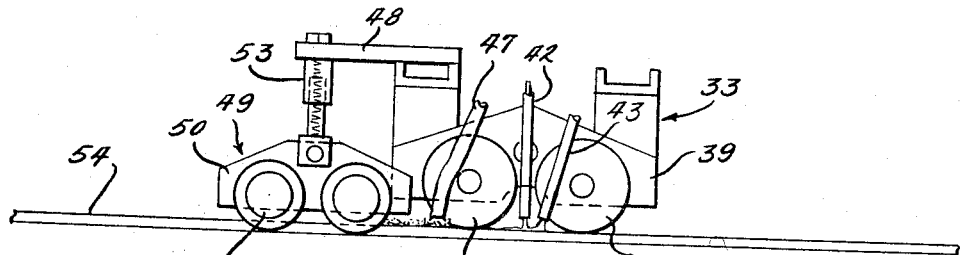
Figure 5:
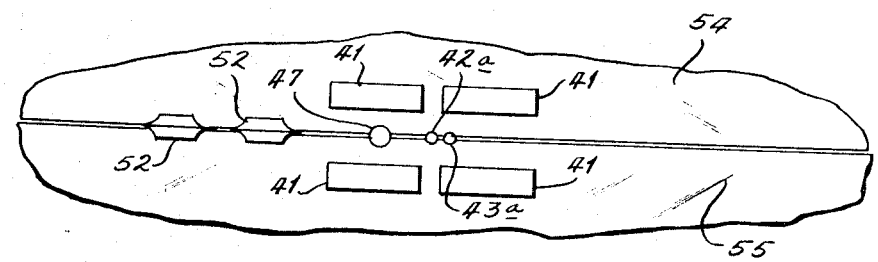
Figure 6:
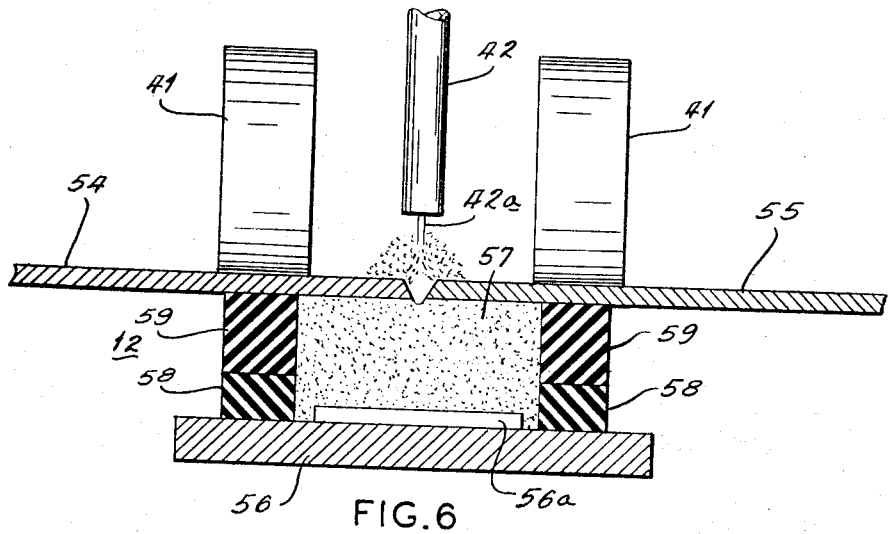

FIG. 3 is a plan view taken along the line 3—3 in FIG. 2;

FIG. 4 depicts the welding head and the roller guide assembly removed from the welding carriage;

FIG. 5 is a schematic plan view illustrating the relative position of weld rods, flux tube, hold down rollers and guide rollers, and FIG. 6 is a schematic elevation view illustrating the resilient backing trough and the welding head appertaining to the invention.

Figure 1:
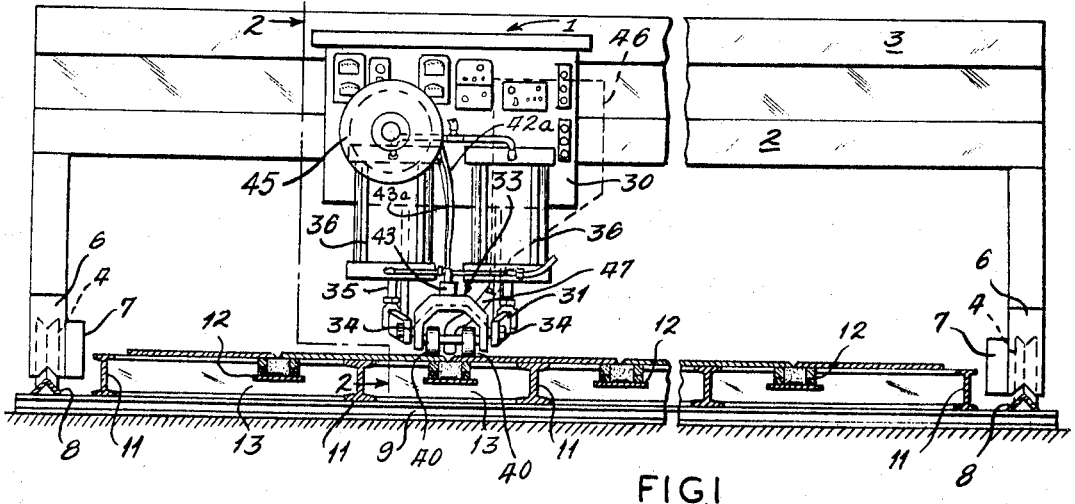
FIG. 1 is a sectional rear elevation depicting the welding apparatus along with a workpiece and backing trough.

Referring to the drawings and particularly FIGS 1–3, the welding carriage 1 is supported from a cross beam 2 of gantry 3. A pair of V-notch wheels 4 are provided in trucks 6 at each side of gantry 3, and are individually powered by hydraulic motors 7 to move the gantry 3 along V-rails or tracks 8. One of the trucks 6 is pivoted directly under the gantry beam 2 in order to assure an equal pressure on all four V-notch wheels 4 in the event misalignment in elevation of the V-rails 8 occurs. The gantry 3 spans a work floor 9 which rests on the ground. A series of I-beams 11 are spaced parallel to rails 8 along work floor 9. Resilient backing troughs 12 (described in detail hereinafter) are provided between I-beams 11, spaced from work floor 9 by supports 13.

Gantry cross beam 2, as best seen in FIG. 2 is formed of a pair of I-beams 14 welded together along flange margins 16. The outer faces of I-beams 14 each have a pair of angle plates 17, each secured from an outer flange 18 to center portion 19 of the I-beams 14. Intermediate each pair of angle plates 17, a spacer plate 21 is provided, recessed from the exposed outer face of angle plates 17. Such construction provides beam 2 with a pair of hanger tracks. Beneath I-beams 14 are a rack 22 and a guide rail 23. Welding carriage 1 is suspended by upper and lower hanger rollers 24 from cross beam 2 in the hanger tracks. Carriage 1 mounts reversible pneumatic motor 26 which drives spur gear 27 that is in constant engagement with rack 22. Guide rollers 28 engage each side of guide rail 23 to stabilize carriage 1. Activation of motor 26 drives spur gear 27 along rack 22 moving carriage 1 along cross beam 2 of gantry 3. Air is provided to motor 26 from accumulator 28 which is supplied by a remote source through air hose 29. Carriage 1 has a control panel 30 with associated piping and wiring to control movement and operation of the apparatus for well known submerged arc welding. Of course, movement of the gantry 3 is independently controlled.

Extending from carrier 1 are trailing arms 31 pivoted about pins 32. Arms 31 mount weld head assembly 33 for pivotal movement about pivot pins 34. Plunger rods 35 of pneumatic cylinders 36 are connected to trailing arms 31 by yokes 37 for raising and lowering weld head assembly 33. Air to operate the cylinders 36 is supplied from a suitable source through air hoses 38. The weld head assembly 33 (see FIGS. 3 and 4 in particular), includes a box frame 39 which supports rollers 40 on axle assemblies 41. Submerged arc welding heads 42 and 43 are mounted from the side rails of box frame 39. The leading head 42 is a DC electrode type and the trailing head 43 is an AC electrode type. Welding rod 42a is fed to head 42 from storage reel 44 whereas welding rod 43a is fed to head 43 from storage reel 45. Reels 44 and 45 are mounted on carriage 1 above respective welding heads. A flux hopper 46 is supported by carriage 1 adjacent reels 44 and 45. Welding flux is dispensed at a metered rate from hopper 46 through flux tube 47 in front of leading welding head 42. A mounting plate 48 extends from the front or leading wall of box frame 39. Roller guide assembly 49, which includes side rails 50 spaced apart by axles 51 for mounting V rollers 52, is pivotally mounted from spring load support assembly 53, which is attached to plate 48. The spring loading maintains V rollers 52 in the groove between beveled workpieces 54 and 55 to be butt welded. Since roller guide assembly 49 is pivotally mounted, V rollers 52 may pass over tack welds without jumping the groove. In this arrangement V rollers 52, guide assembly 49 and welding head assembly 33 act together by virtue of being pivoted from trailing arms 31. In FIG. 5 the relation of rollers 41 and V rollers 52 with respect to welding rods 42a and 43a, and flux tube 47 is illustrated schematically for butt welding workpieces 54 and 55.

In FIG. 6 the backing trough 12 is illustrated. Trough 12 includes a base plate 56 with an optional insulating board 56a to prevent shorting of the electrodes in the event the electrodes blow through the backing media 57. Spaced apart and seated on base plate 56 are resilient cushion side walls 58. Side rails 59 rest on side walls 58 which support workpieces 54 and 55 near the edges to be butt welded. The backing trough 12 is constructed such that rollers 41 bearing against workpieces 54 and 55 are directly above side rails 59. No clamps are required to hold workpieces 54 and 55 against side rails 59.

In operation of the welding apparatus, carriage 1 is moved by operation of pneumatic motor 26 so that, when trailing arms 31 are lowered, V rollers 52 will align with the seam formed by the groove between workpieces 54 and 55. The welding head assembly is adjusted to make sure that the flux tube 47 and electrodes 42 and 43 are properly positioned; pneumatic cylinders are further adjusted to apply an appropriate pressure on rollers 41 and workpieces 54 and 55 to compress cushion side walls 58 in the area under welding head 33 and create an appropriate backing pressure of the backing media against the underside of workpieces 54 and 55 in the area of the seam under the electrodes. In this manner, the workpieces 54 and 55 are held down against side rails 59 only in the immediate vicinity to be welded. Next, the appropriate weld controls are activated and the motors 7 of the gantry 3 are activated and automatically drive gantry 3 along the tracks 8. As the gantry moves the carriage 1 and weld head assembly 33 traverse the seam between workpieces 54 and 55. During the seam welding, it will be appreciated that a constant pressure is positively maintained on the underside of the weld, and the weld condition is always uniform so that as the welding progresses any distortion will come and go without disturbance to the area of the workpieces undergoing welding.

It will be understood and appreciated that any of the known submerged arc welding or tandem arc welding techniques may be employed in conjunction with the apparatus and techniques of the invention wherein the workpieces are forced against the resilient backing trough only in the area being welded, thus maintaining a constant, uniform backing pressure against the workpieces in the area undergoing welding.

Various modification and changes will become immediately apparent to those skilled in the art, and all such changes are deemed to be within the scope and spirit of the invention which is limited only as necessitated by the scope of the appended claims.

What is claimed is:

1. Apparatus for submerged arc welding work along a seam comprising a backing trough having a base member, longitudinally directed side walls carried on said base forming a channel and having backing media therein, means carried by said base member resiliently supporting said side walls from said base member, means to support the work with the seam over the channel in said backing trough, translatable welding means for welding along the seam, and means translatable concurrently with said welding means to provide localized pressure against said work in the area of the seam over the channel for compressing said side walls of said backing trough against said base member to force the backing media against the underside of said seam beneath the welding means.

2. Apparatus for submerged arc welding a workpiece along a seam comprising a movable gantry having a spanning beam, a welding carriage translatably suspended from said beam, welding means including a weld head mounted by said carriage in such manner as to permit raising and lowering relative to said carriage, pressure roller means attached to said welding head, guide roller means supported from the leading end of said welding head to guide said welding head along said seam, a backing trough having resilient side walls and having backing media therein, means for supporting said workpiece with the seam for welding positioned intermediate the resilient side walls, and means to raise and lower said welding head whereby in the lowered position said pressure roller means force the workpiece against said backing trough to compress said side walls forcing said backing media uniformly against the underside of the workpiece in the area of the seam under the welding head, and means to operate said apparatus to weld along the seam of the workpiece.

3. Apparatus for submerged arc welding a workpiece along a seam between beveled workpieces comprising a movable gantry having a spanning beam, a welding carriage translatably suspended from said beam, welding means including a weld head pivotally mounted by said carriage, means for limited raising and lowering said weld head relative to said carriage, pressure roller means attached to said welding head, guide roller means pivotally supported from the said welding head to guide said welding head along said seam, means to bias said guide rollers in the seam, a backing trough having resilient side walls and having backing media therein, means for supporting said workpiece with the seam for welding positioned intermediate the resilient side walls, said means to raise and lower said welding head being suitable to force said pressure rollers sufficiently against the workpieces to compress said side walls forcing said backing media uniformly against the underside of the workpiece in the area of the seam under the welding head, and means to operate said apparatus to weld along the seam of the workpiece.

4. In a system for submerged arc welding work along a seam including a movable gantry with a horizontal cross beam, a welding carriage translatably supported by the cross beam and a vertically translatable welding head means pivoted from the welding carriage; the improvement in combination comprising a work supporting backing trough having a base, spaced side walls resiliently mounted on said base in position to retain backing media therein, means to support the work upon said side walls with the seam over the backing media trough, roller means carried by the welding head means, and means to force the roller means against the work in the adjacent limited area of the seam for compressing the backing trough under the seam to force backing media upwardly and uniformly against the underside of the seam in the area beneath the welding head.

5. The system of claim 4 wherein the roller means includes a pair of rollers directly over each side wall of the backing trough.

6. In a system for submerged arc welding work wherein the welding head is guided over the work along a seam, and wherein the welding head is suspended from a gantry and is traversed along the seam, the improvement comprising a backing trough having a base wall and side walls carried by said base wall forming an open top channel and having backing media therein, means to support said side walls resiliently and independently of each other from said base wall, means to carry the work with the seam over the backing trough, and means coacting with the welding head to apply localized pressure against the work in the area of the seam under the welding head compressing the resiliently supported side walls of the backing trough thereunder to force backing media uniformly against the underside of the seam beneath the welding head.

7. A method of submerged arc welding work along a seam comprising the steps of providing a supply of welding flux along the seam to be welded opposite to the side of the welding work, resiliently supporting said welding flux, positioning the work with the seam over the supply of welding flux backing trough, moving submerged arc welding means along the seam, forcing the work against the supply of welding flux in the area of the seam to be made underneath the welding means to compress the welding flux progressively with movement of the arc welding means against the underside of the seam.

8. A method of submerged arc welding work along a seam comprising the steps of providing a movable gantry with a cross beam and a submerged arc welding means movable along said cross beam, providing a resilient backing trough with welding flux therein, positioning the work with the seam over the backing trough, aligning the arc welding means over the seam, moving the gantry along a path where the arc welding means tracks the seam to weld it, and locally pressing the work against the backing trough in the area of the seam beneath the arc welding means to force welding flux against the underside of the seam in the local area of the welding means.

References Cited

UNITED STATES PATENTS

| | | | |
|---|---|---|---|
| 2,280,150 | 4/1942 | Hasse et al. | 219—137 |
| 2,331,937 | 10/1943 | Schreiner | 219—73 |
| 2,685,629 | 8/1954 | Peck | 219—125 |
| 2,945,937 | 7/1960 | Tinsley et al. | 219—160 |
| 3,072,779 | 1/1963 | Masters et al. | 219—125 |
| 3,162,161 | 12/1964 | Verbeek | 219—125 |
| 3,171,012 | 2/1965 | Morehead | 219—124 |
| 3,197,604 | 7/1965 | Turbyville et al. | 219—160 |
| 3,219,250 | 11/1965 | Drummond | 219—160 |
| 3,275,794 | 9/1966 | Dubusker et al. | 219—125 |

RICHARD M. WOOD, *Primary Examiner.*

W. DEXTER BROOKS, *Assistant Examiner.*

U.S. Cl. X.R.

219—160, 73